T. MANNERS.
COTTON PICKING MACHINE.
APPLICATION FILED APR. 17, 1915.
1,177,120.
Patented Mar. 28, 1916.
3 SHEETS—SHEET 1.
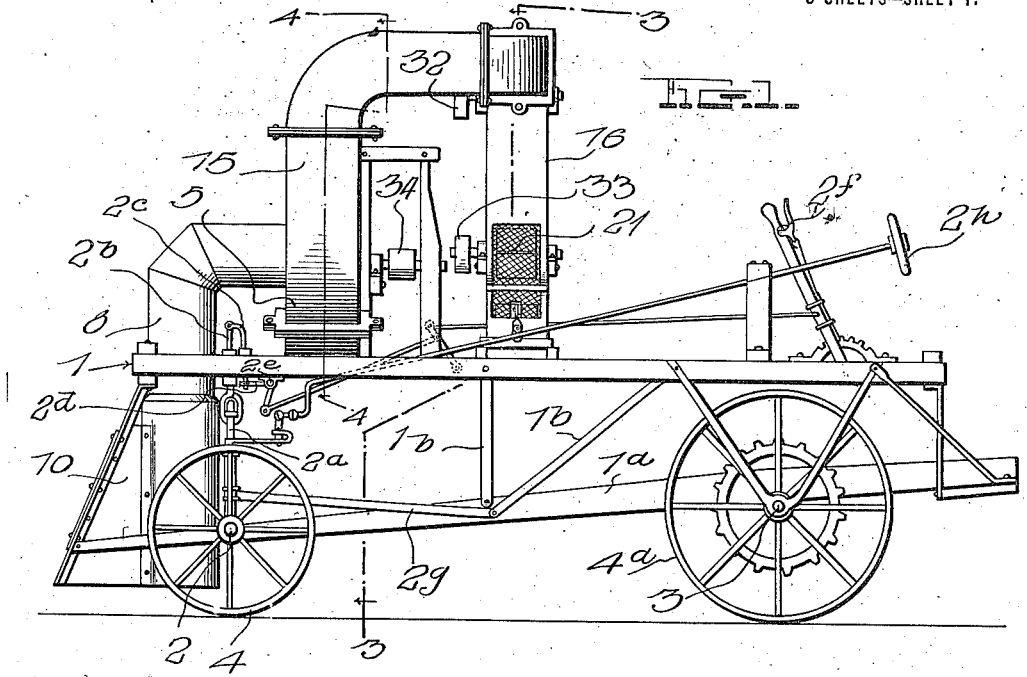
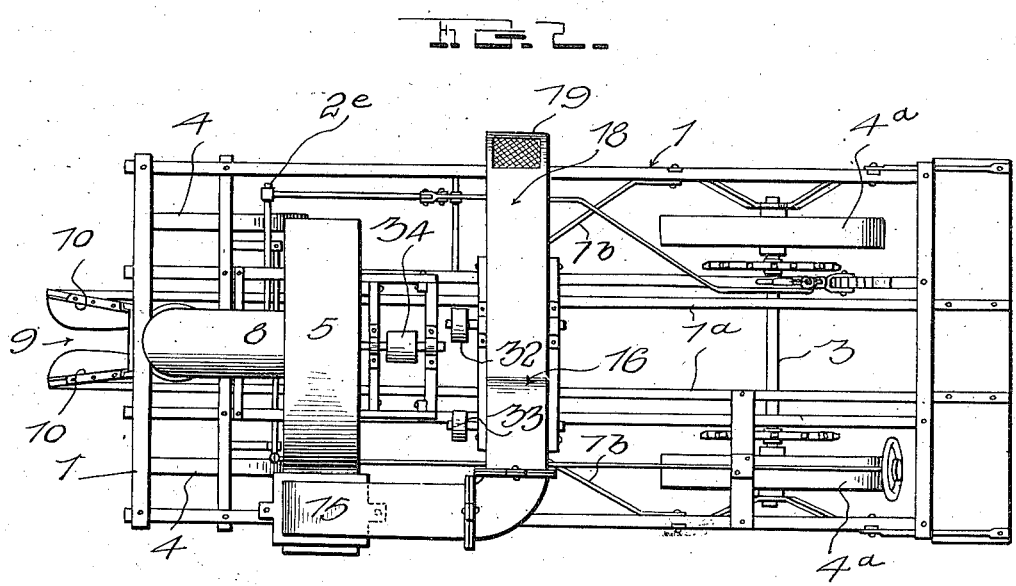
Witnesses
H. Woodard
Inventor
Thomas Manners
By
Attorneys

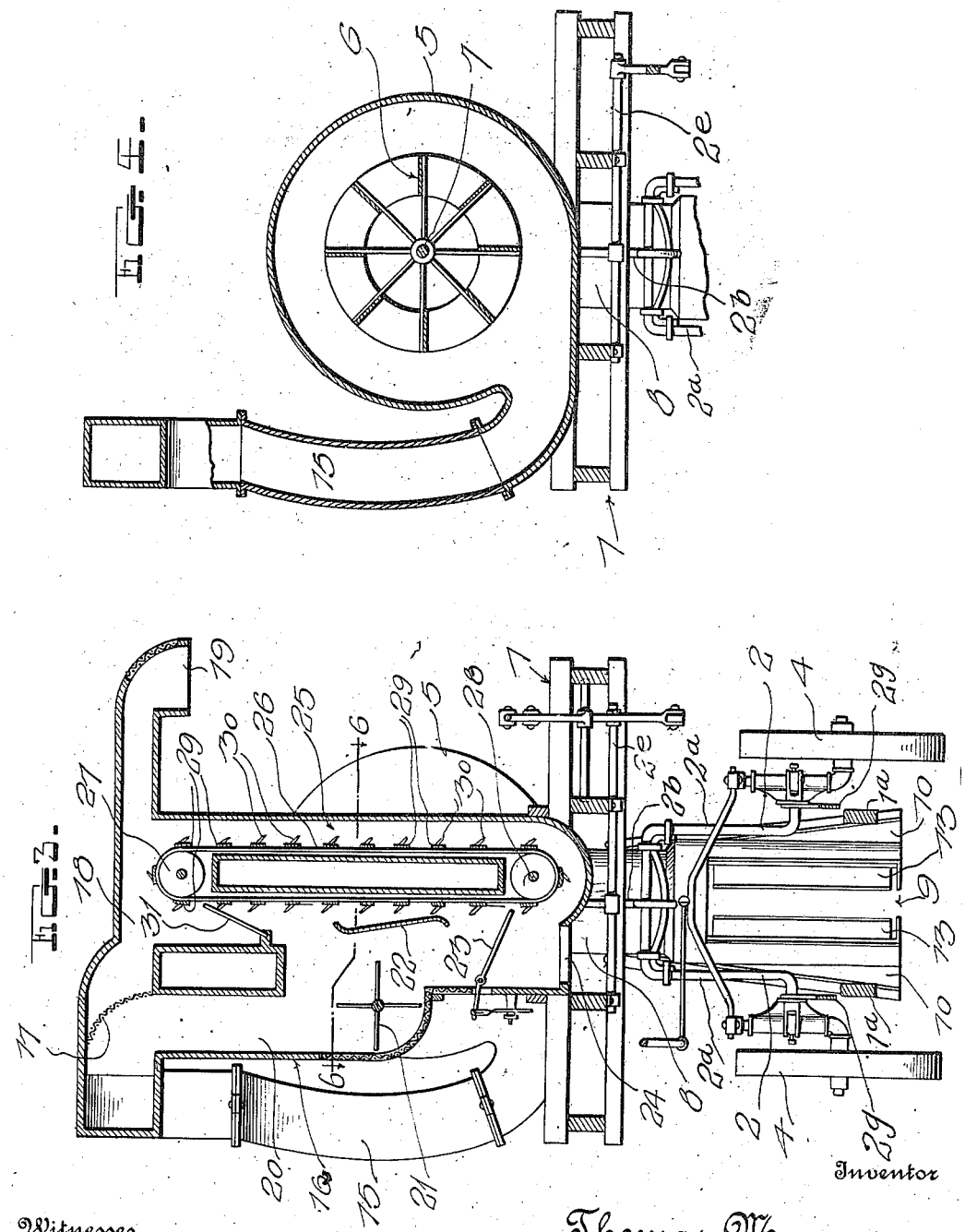

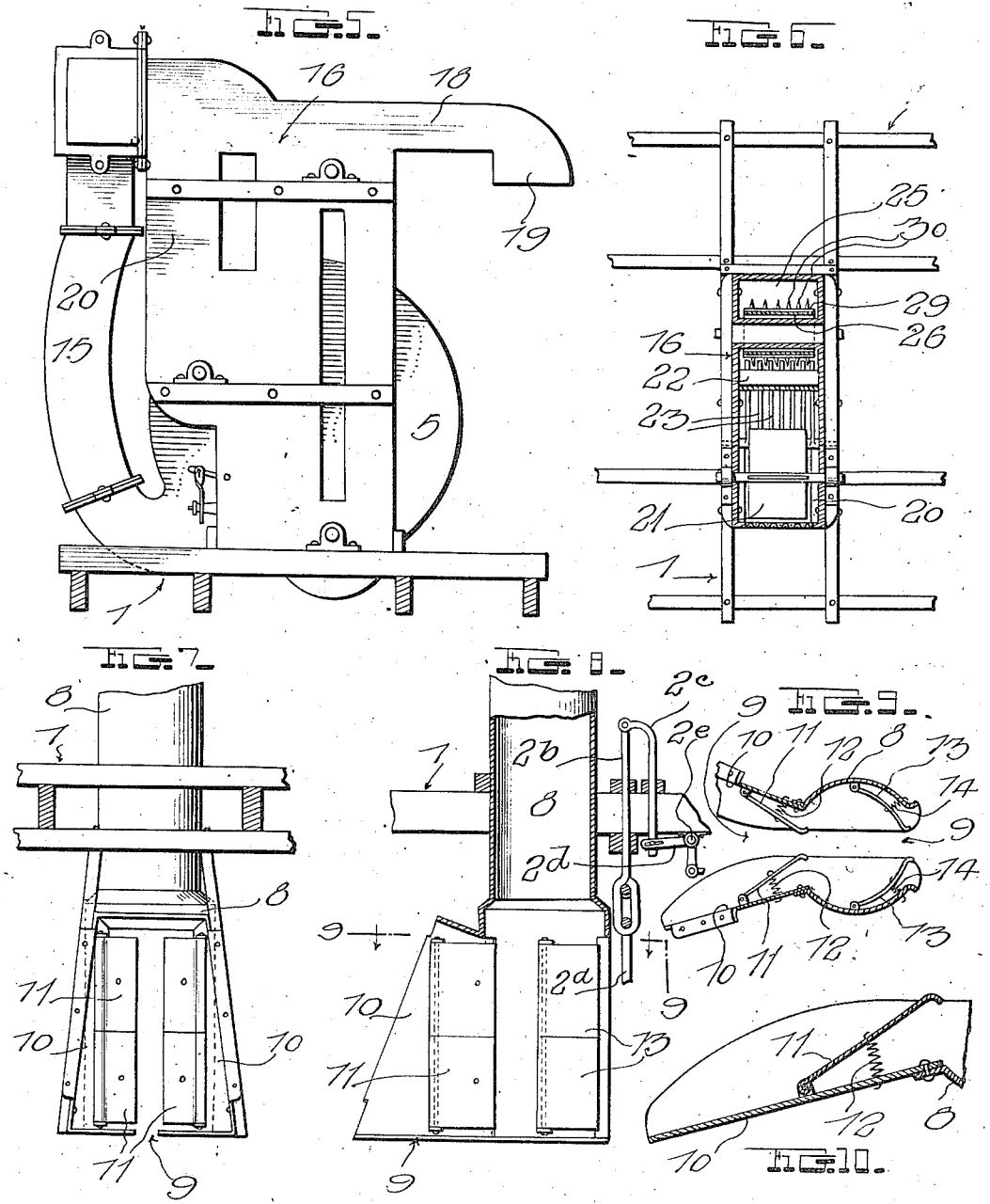

ns of Lectors Patent.## UNITED STATES PATENT OFFICE.

THOMAS MANNERS, OF WATERLOO, OKLAHOMA.

COTTON-PICKING MACHINE.

1,177,120.

Specification of Letters Patent.

Patented Mar. 28, 1916.

Application filed April 17, 1915. Serial No. 22,011.

*To all whom it may concern:*

Be it known that I, THOMAS MANNERS, a citizen of the United States, residing at Waterloo, in the county of Logan and State of Oklahoma, have invented certain new and useful Improvements in Cotton-Picking Machines; and I do declare the following to be a full, clear, and exact description of the invention, such as will enable others skilled in the art to which it appertains to make and use the same.

This invention relates to new and useful improvements in cotton picking machines and the primary object of the invention is to provide an improved device which will remove the ripe cotton from the growing plant without danger to the green bolls.

A further object of the invention resides in providing a device which through the medium of suction removes the cotton from the plant and thoroughly cleans such cotton, the cleaning process being such as to also separate any trash or foreign matter which is sucked into the machine simultaneously with the cotton.

A still further object resides in the provision of a machine which is simple and durable in construction, comparatively inexpensive to manufacture and one which will be very efficient and useful in operation.

With these and other objects in view the invention consists in the novel features of construction, combination and arrangement of parts as will be hereinafter referred to and more particularly pointed out in the specification and claims.

In the accompanying drawings forming a part of this application: Figure 1 is a side elevation of a machine constructed in accordance with my invention; Fig. 2 is a plan view thereof; Fig. 3 is a vertical transverse section therethrough as seen on line 3—3 of Fig. 1; Fig. 4 is a similar view as seen on line 4—4 of Fig. 1; Fig. 5 is a detail elevation of the casing containing the cleaning mechanism, the frame being disclosed in section; Fig. 6 is a horizontal section taken on line 6—6 of Fig. 3; Fig. 7 is an enlarged detail front elevation of the lower portion of the suction device; Fig. 8 is a vertical section therethrough; Fig. 9 is a horizontal section through the same as seen on line 9—9 of Fig. 8; and, Fig. 10 is an enlarged detail section therethrough showing more clearly the manner of applying the hinged wings.

In describing the invention, I shall refer to the accompanying drawings in which similar reference characters designate corresponding parts throughout the several views and wherein 1 indicates a horizontally disposed frame supported by suitable means above the front and rear axles 2 and 3 respectively, these axles being equipped with front and rear wheels 4 and 4$^a$. Directly beneath the frame 1 and rigidly connected thereto by suitable brace rods or the like 1$^b$, is a supplemental frame 1$^a$ whose rear end is mounted on the rear axle 3 while its front end may move vertically beneath the arch 2$^a$ of the front axle 2, the front end of the supplemental frame being secured to the picking means yet to be described. It thus follows that when the front ends of the frames 1 and 1$^a$ are adjusted vertically simultaneously, such picking means will likewise be so moved.

For the purpose of adjusting the frames 1 and 1$^a$ vertically, I preferably support the front of the frame 1 from the arch 2$^a$ by loosely connecting the upright rod 2$^b$ to said arch, said rod being mounted loosely within suitable guides carried by the frame 1 and having its upper end pivoted to the upper end of a link 2$^c$, the lower end of the latter being pivoted to a crank arm 2$^d$ carried by a rock shaft 2$^e$ journaled on the frame 1 and actuated through suitable connections from the hand lever 2$^f$. Thus it will be seen that actuation of the hand lever in the proper direction will raise and lower the frames 1 and 1$^a$ in respect to the arch 2$^a$, the latter being suitably braced by the provision of bars 2$^g$ which are pivoted thereto and to the supplemental frame 1$^a$. Needless to say, the frames 1 and 1$^a$ are adjustable vertically for the purpose of varying the distance between the lower end of the picking mechanism and the field over which the machine is being propelled.

The arched axle 2$^a$ is held against lateral swinging by the bracing bars 2$^g$, but the ends of said axle are preferably equipped with suitable journals upon which the wheels 4 are mounted, said journals and the wheels thereon being capable of horizontal swinging for steering purposes, such swinging being imparted by the steering wheel 2$^h$ and any suitable means between the same and said journals.

Suitably mounted on the frame 1 adjacent the forward end of the same is a casing 5 in which is rotatably mounted a suction fan 6. This fan 6 consists of radial spokes mounted on a shaft 7, the spokes being in turn secured to the front and rear blades which are riveted or otherwise secured to said spokes.

One face of the casing 5 has an enlarged opening therein to which is connected the upper curved end of a substantially vertical pipe section 8 the latter depending through the frame 1 to a point adjacent the surface of the ground. An essential part of my invention resides in the construction of this suction pipe which will be described in detail below.

The pipe 8 is enlarged at its lower end and slotted vertically to provide a channel-way or the like 9 therein and the bottom of this pipe is closed with the exception of the channel-way which continues through said bottom. This channel-way is adapted to receive therethrough the stalks of the plants as the machine is propelled through the fields, it being understood that the wheels of this machine straddle the numerous rows of cotton one at a time. Secured to the forward portion of the pipe 8 for the full length of the slot or channel therein are the forwardly divergent and tapering flanges 10 which provide a guide-way for the stalks to direct the latter toward the channel of the suction pipe. Pivoted or hinged at their front edges upon upright axes to the faces of these flanges 10 are the wings 11 which converge rearwardly toward the center of the pipe. These hinged wings 11 extend the full height of the slot or channel 9 and each wing is preferably formed of upper and lower sections to allow said wings to more readily adjust themselves to the different widths of the tops and bottoms of the rows of cotton plants. Coil spring members 12 are provided in the rear of these wings to contact with the rear faces thereof and the faces of the flanges 10 so as to direct said wings toward one another. In this manner as the device is propelled and stalks are directed into the guideway formed by the flanges 10, said stalks will be grasped and the same held by the wings 11 so that the cotton may be more readily sucked from the stalks.

The wings 11 are, as stated above, arranged in the forward portion of the pipe 8 and also hinged to said pipe to coöperate with the rear portion of the slot or channel 9 wherein are the additional wings 13. These latter wings converge rearwardly and coil springs 14 are provided between the same and the inner face of the wall of the pipe to direct said flanges toward one another as clearly shown in Fig. 9 of the drawings. These wings perform the same function as the wings 11 above mentioned. The wings 11 and 13 are so constructed as to extend the full height of the slot or channel 9 in the pipe 8 so that any stalk which passes therethrough will be momentarily retained within the extension of the pipe to have the cotton sucked therefrom.

Continuing from the casing 5 is a pipe-like section 15 which is directed upwardly and rearwardly to connect and communicate with a casing 16 in which is disposed the cleaning mechanism. It will be understood that as the cotton is sucked from the stalks up through the pipe 8 the same is directed from the casing 5 through the pipe-like section 15 to this casing 16. At the junction of the section 15 with the casing 16 a screen or the like 17 is provided, the same being disposed at an angle and so disposed that all materials sucked into the casing 16 will be directed thereagainst. The air sucked into this casing 16 will be directed through the screen and through a laterally extending pipe-like section 18 the latter finally terminating at its outer end in an enlarged portion indicated as 19 which communicates with a receptacle or the like as will be hereinafter and more particularly set forth. The cotton or other materials however, will upon striking the screen 17, be directed downwardly through a channel or passage-way 20 in the casing 16 to be engaged by a beater 21 which is rotatably mounted in said casing 16 about midway of its ends. This beater thoroughly threshes the cotton to separate the hulls therefrom and said cotton and hulls are then directed with considerable force against a sheet 22 which is mounted in the lower portion of the channel or passage-way 20. From this sheet the materials will drop downwardly to an arcuately adjustable grate or sifter 23 which is formed of a plurality of fingers. These fingers are so disposed with respect to one another as to permit the hulls, dirt and all other extraneous matter to readily pass therethrough from which point the same are directed out through an opening 24 in the bottom of the casing 16 to any desired receptacle which may be provided for receiving the same.

On the opposite side of the sheet 22 is another passage or channel-way 25 in which is suitably mounted an endless carrier 26 which operates vertically therewithin. This endless carrier operates over an upper and lower pulley 27 and 28 respectively and the same consists of a belt or other endless strip of flexible material having a plurality of transverse bars or strips 29 from which project a plurality of prongs or teeth 30. The teeth 30 are arranged to coöperate with the ends of the ribs of the grate 23 and as these ribs are directed downwardly it will be appreciated that the cotton remaining on the same after the hulls have been removed therefrom will be engaged by said teeth 30 as the endless carrier is operated. The cotton will be carried upwardly by this carrier and passed under a brush or the like 31 which is mounted in the upper portion of the casing 16. The upper portion of the channel or passage-way 25 connects with the transverse passage 18 so that as the cotton is carried up to a point above the pulley 27 the same will receive thereagainst the currents of air directed through the screen 17, as above mentioned. The cotton will, after being directed through the various mechanisms just described and thoroughly cleansed, be forced from the casing 16 under action of the air currents through the transverse member 18 to be emptied into a receptacle coöperating with the free end 19 of said member 18. It will be appreciated that in the course taken by the cotton from its entrance into the casing 16 to its exit therefrom the same coöperates with four cleaning processes and in this manner all dirt, hulls and extraneous matter will be entirely removed from the cotton. The shafts for the beater 21 and the upper pulley 27 of the carrier extend beyond the casing 16 and have pulleys 32 and 33 respectively provided thereon with which may coöperate belts or other means (not shown) to drive the same from any source of power (not shown). The shaft 7 of the fan 6 also projects beyond the rear face of the casing 5 and has a pulley 34 whereby said fan may also be driven from the same source of power driving the members hereabove mentioned.

The various casings and pipe sections used in this device are so applied to the main frame as to be readily removed therefrom whereby this complete truck with the cotton picking portion removed therefrom may be applied to use in other connections when desired. It must also be stated that the frames 1 and 1ª are movable for vertical adjustment to compensate for plants and stalks of various heights, said frames carrying with them the picking and cleaning mechanism.

From the foregoing it will be seen that I have provided a simple, inexpensive and efficient means for carrying out the objects of the invention and while I have particularly described the elements best adapted to perform the functions set forth, it is obvious that various changes in form, proportion and in the minor details of construction may be resorted to, within the scope of the appended claims, without departing from the spirit or sacrificing any of the principles of the invention.

Having thus described my invention, what I claim is:

1. In a cotton picking machine, a frame, an upright suction pipe mounted thereon and having its lower end terminating adjacent the surface of the ground and equipped with an inlet mouth, laterally yieldable rearwardly converging wings carried within the mouth and mounted on upright axes adjacent the opposite sides of said mouth, and means for creating suction in the pipe.

2. In a cotton picking machine, a frame, an upright suction pipe mounted thereon and having its lower end terminating adjacent the surface of the ground, the lower portion of said pipe being formed with a vertical slot in its front side, laterally yieldable rearwardly converging members carried by the pipe on both sides of the slot in said pipe, and means for creating suction in the pipe.

3. In a cotton picking machine, a frame, an upright suction pipe carried thereon, projecting below the same, and terminating adjacent the surface of the ground, the lower portion of said pipe being formed with a vertical slot in its front side, an extension projecting forwardly from the front side of the pipe and forming an inlet mouth, laterally yieldable members carried on the sides of the mouth and of the pipe, and means for creating suction in said pipe.

4. In a cotton picking machine, a frame, an upright suction pipe carried thereon, projecting below the same, and terminating adjacent the surface of the ground, the lower portion of said pipe being formed with a vertical slot in its front side, an extension projecting forwardly from the front side of the pipe and forming an inlet mouth, laterally yieldable wings carried on the sides of the mouth and of the pipe, and means for creating suction in said pipe.

5. In a cotton picking machine, a frame, an upright suction pipe carried thereon and projecting below the frame to a point adjacent the surface of the ground, the lower projecting portion of said pipe being formed with a vertical slot in its front side, a forwardly projecting extension on the pipe forming an inlet mouth therefor, pairs of laterally yieldable wings hinged to the sides of said mouth and pipe and extending the full length of the slot in said pipe, and means for creating suction in the pipe.

6. In a cotton picking machine, the combination with a portable frame; of an upright suction pipe carried thereby and having the front and rear sides of its lower portion formed with vertical slots, a pair of upright flanges secured at their rear edges to the front side of the pipe on opposite sides of the slot therein and diverging forwardly from said pipe, rearwardly converging laterally yieldable wings hinged upon upright axes to the inner sides of said flanges, additional rearwardly converging laterally yieldable wings carried by and within the pipe and hinged upon upright axes adjacent the opposite sides of said pipe, and means for creating suction in said pipe.

7. In a cotton picking machine, a portable frame, a suction pipe carried thereby and having an inlet mouth, a pair of rearwardly converging laterally yieldable wings carried within the mouth and hinged upon upright axes adjacent the sides of said mouth, said wings being formed of upper and lower sections movable independently, and means for creating suction in said pipe.

In testimony whereof I have hereunto set my hand in presence of two subscribing witnesses.

THOMAS MANNERS.

Witnesses:
J. I. LYON,
E. SHIDLER,